Nov. 29, 1955  S. B. McLEOD  2,725,074
BI-DIRECTIONAL FLOW VALVE STRUCTURE
Original Filed March 21, 1949
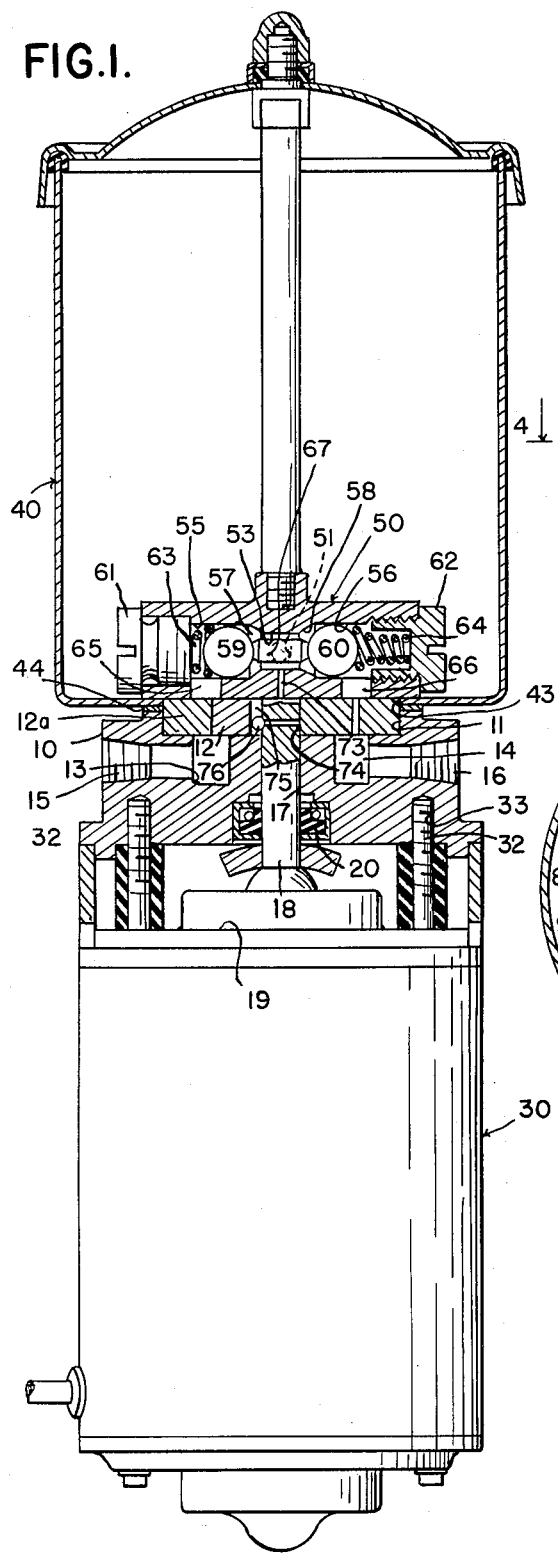
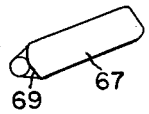
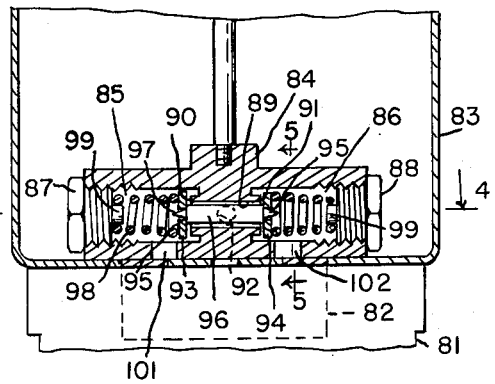
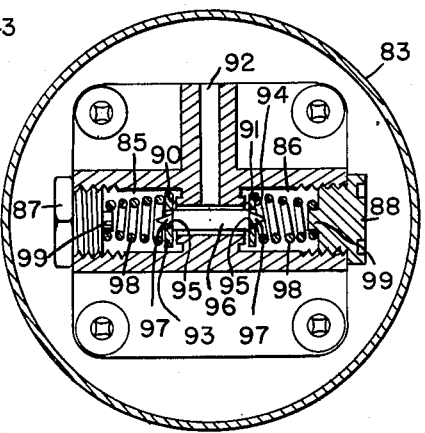
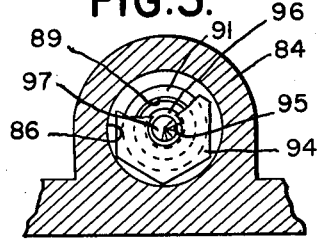
INVENTOR.
STEWART B. McLEOD
BY Whittemore,
Hulbert & Belknap
ATTORNEYS United States Patent Office 2,725,074
Patented Nov. 29, 1955

2,725,074

BI-DIRECTIONAL FLOW VALVE STRUCTURE

Stewart B. McLeod, Dearborn, Mich., assignor to Detroit Harvester Company, Detroit, Mich., a corporation of Michigan Original application March 21, 1949, Serial No. 82,529. Divided and this application March 27, 1950, Serial No. 152,103

9 Claims. (Cl. 137—493.9)

The present invention relates to valve structure and more particularly to a valve designed to be interposed between the inlet and outlet sides of a pump and to connect to a fluid reservoir.

The valve structure is particularly designed to be associated with a hydraulic pump for operating a hydraulic powered system, and the fluid reservoir is associated with the system through the valve in such a manner that as the total quantity of fluid in the system increases or decreases a compensating flow takes place between the fluid reservoir and the system.

The valve is also constructed and arranged to provide for normal by-pass flow between the inlet and outlet side of the pump when the pump is not operating.

This application is a division of my prior copending application, Serial No. 82,529 filed March 21, 1949, now Patent No. 2,640,429.

It is an object of the present invention to provide a valve constituting a by-pass connection for a reversible pump which remains open when the pump is idle, to provide for manual operation of inlet fluid mechanism by which it is closed upon initiation of operation of the pump in either direction.

It is a further object of the present invention to provide a by-pass valve adapted to be inserted between the pressure and suction sides of the pump, adapted to remain open when the pump is idle, to close during normal pump operation in either direction, and to re-open in the event of excessive pressure at the pressure side of the pump.

It is a feature of the present invention to provide a valve structure comprising a body having a pair of chambers interconnected by a passage, a valve element in each of said chambers, designed to close the opening between said chamber and said passage, said valve elements each having a port therethrough, a pin in said passage having reduced portions extending into the opening in said valves, spring means in said chambers normally retaining said valves against shoulders on said pins so as to close the openings in said valves, said springs also serving normally to position both of said valves in spaced relation to the valve seats provided at the junction between the ends of said passage and said chambers, said valves being initially closed by pressure established in either of said chambers, said pin being yieldable upon attainment of a predetermined higher pressure in said chambers to establish a by-pass opening through said body.

Other objects and features of the invention will become apparent as the description proceeds, especially when taken in conjunction with the accompanying drawings, wherein:

Figure 1 is a fragmentary vertical section through a combined pump and valve assembly.

Figure 2 is a perspective view of a pin employed in the valve.

Figure 3 is an elevational view partly in vertical section showing a modified form of valve.

Figure 4 is a section on the line 4—4, Figure 3.

Figure 5 is an enlarged sectional view on the line 5—5, Figure 4.

The present construction comprises a block 10 carried at the top of a motor housing 30 and supporting at its upper surface a fluid reservoir 40.

The block 10 is provided with a cylindrical recess 11 at its upper surface in which is mounted a rotary pump of known type. Preferably the pump is of the type comprising an annular, internally toothed rotor 12a having a gear 12 therein, the teeth of the gear being one less in number than the internal teeth of the rotor. Communicating with the bottom of the recess 11 are a pair of fluid circulating passages 13 and 14 which in turn communicate with tapped connecting portions 15 and 16 respectively. It will be appreciated that the device illustrated is for use in supplying fluid to a hydraulic system and that the system will include conduits having threaded connectors cooperating with the connecting portions 15 and 16. Passages 13 and 14 serve as inlet and outlet connections to the pump, depending upon the direction of rotation thereof. In other words, the pump is reversible and in one instance fluid will be drawn in through the passage 13 and discharged through the passage 14, whereas when the pump is rotated in the opposite direction, the direction of flow of the fluid is reversed.

The block 10 is provided with an opening 17 therethrough which is coaxial with the cylindrical recess 11 and which receives the drive shaft 18 of an electric motor indicated at 19. The lower end of the opening 17 is enlarged to receive a suitable seal and bearing 20 for the shaft 18.

The motor 19 is carried within the housing 30 which is assembled to the block 10 by means of long attaching screws 32 threaded into tapped recesses in the block 10 as indicated at 33.

Located on the upper surface of the block 10 is a reservoir, a portion of which is indicated at 40. As illustrated the reservoir 40 may be in the form of a sheet metal cup, the bottom of which is provided with a circular opening 43 surrounding the rotor 12a, and a sealing gasket 44 is provided between the bottom 42 and the upper surface of the block 10.

Located within the reservoir 40 is a valve 50 which serves to provide and control fluid supply passages between the reservoir and pump. A first passage 51 communicates with a short, relatively small transverse passage 53 formed in the valve body. At its outer end the passage 53 communicates with enlarged chambers 55 and 56. Intermediate the passage 53 and the two enlarged end chambers 55 and 56 are conical valve seat portions 57 and 58 respectively. Located within the chambers 55 and 56 are ball valves 59 and 60 respectively. The outer ends of the openings 55 and 56 are closed by threaded plugs 61 and 62 respectively, and intermediate the plugs 61 and 62 and the ball valves 59 and 60 are balancing springs 63 and 64. Extending laterally from the chambers 55 and 56 are ports 65 and 66 which communicate with the side of the gear pump opposite to ports or passages 13 and 14.

Intermediate the ball valves 59 and 60 is a slidable element 67, shown in detail in Figure 2. The element 67 may conveniently be formed of metal of triangular cross section and preferably has rounded corners as indicated at 69. The element 67 is slidably received in the passage 53 but by virtue of its triangular cross section it permits flow of fluid through the passage 53.

The element 67 is of such length that when the ball valves 59 and 60 are symmetrically located with respect to their seats 57 and 58 respectively, both valves are in partially open position. On the other hand, it will be readily apparent that when one of the ball valves 59 or 60 closes by virtue of pressure existing in the chamber in which it is located, the other of the ball valves is mechanically moved to full open position.

Springs 63 and 64 are of substantially equal strength so that in the absence of pressure in the device the ball valves stand in the partially open position shown in Figure 1. The valve body 50 is provided with a transverse passage 73 which communicates with an opening 74 provided in the gear member 12 and which permits flow of oil therethrough to relieve pressures which might otherwise build up. The gear 12 is provided with a keyway 75 which receives a driving ball or key 76 seated in a recess at the end of the drive shaft 18.

The operation of the device is believed to be readily apparent, especially when taken in consideration with the full discussion of my prior construction contained in Patent 2,388,755 and my copending applications, Serial No. 776,635, now Patent No. 2,588,644 and Serial No. 82,529, now Patent No. 2,640,429, of which the present application is a division. However, for completeness, it may be noted that upon the establishment of pressure by operation of the pump in the circulating fluid passage 14, pressure will simultaneously be established within the chamber 56 and will close the valve 60. At this time suction is established in the passage 13 at the opposite side of the block 10 and also in the chamber 55. At this time since the ball valve 60 is forced on its seat by pressure, the ball valve 59 is in fully open position, thus establishing communication between the interior of reservoir 40 through the passage 51 which opens at its outer end into the reservoir 42 and the suction side of the pump. As a result of this, and in the event that the demand for fluid in the pressure side of the circulating system is more than can be supplied from the suction side thereof, the difference in fluid required is made up by withdrawing fluid from the reservoir, as will be readily apparent.

At the same time, should excess fluid be delivered to the suction side of the pump from the system, this excess fluid will flow through the valve into the reservoir. Thus the valve and reservoir operate to keep the hydraulic system, including the pump, always filled with fluid despite variation between fluid delivered to the pressure side and fluid withdrawn or expelled from the suction side.

Another very important feature of the balanced arrangement of ball valves is its service as a by-pass around the pump. Where the unit is employed as a power unit for raising and lowering a convertible top or other use, the balanced valves provide for a limited by-pass flow of fluid around the pump, and permit manual operation of the operated device at a slow rate. In this case the flow of fluid is in one direction or the other through the following sequence of passages: passage 14, the pump, passage 66, valve 56, passage 53, chamber 55, passage 65, the other side of the pump, and passage 13. Slow manual operation is permitted, whereas rapid operation with corresponding rapid flow of fluid through the valved passages will close one or the other of the ball valves, depending upon the direction of flow.

Referring now to Figures 3–5, there is shown a somewhat different embodiment of the invention which while it operates on the same principles as the embodiment previously described, has the additional function of pressure relief, as will presently appear. In this case the hydraulic power unit comprises a block 81 serving as the support for a pump indicated by the dotted lines at 82, a reservoir 83, and a by-pass and reservoir connection valve indicated generally at 84. With the exception of the by-pass and reservoir valve unit 84, the construction of this embodiment of the invention may be identical with that described in Figure 1 and will therefore not be described in detail. The by-pass and reservoir connection unit 84 provides the additional function of affording pressure relief in the event of attainment of excessive pressures at the discharge side of the pump 82. The valve 84 is provided at its ends with enlarged chambers 85 and 86, closed by threaded plugs 87 and 88 respectively. Interconnecting the chambers 85 and 86 is a passage 89 of reduced diameter, forming at its opposite ends valve seats 90 and 91. A reservoir passage 92 extends transversely from the valve 84 into the interior of the reservoir 83 and communicates with the reduced passage 89 intermediate the valve seats 90 and 91. The valve elements 93 and 94 are provided adjacent the valve seats 90 and 91, each of these valves being provided with a central port 95 as best illustrated in Figure 5. The valves 93 and 94 are of non-circular shape and are illustrated in Figure 5 as being hexagonal so as to provide for flow of fluid through the reduced passage 89 either from end to end or from one to and through the transverse reservoir passage 92. At the same time, valves 93 and 94 fit within the cylindrical inner surfaces of the chambers for sliding movement longitudinally thereof.

Intermediate the valves 93 and 94 is a pin 96 of a diameter slightly smaller than that of the passage 89 such that clearance is provided, the ends of which are provided with reduced extending portions 97 which are herein illustrated as conical and of a diameter at their base substantially equal to the diameter of the port 95 formed in the valves. Intermediate the projecting end portions 97, the pin 96 is of somewhat larger diameter than the ports 95 so as to provide shoulders against which the valves are retained by spring pressure, thus closing the ports 95.

Balancing spring means are provided and take the form of compression springs 98 engaging the ported valves 93 and 94 at one end and seated at their other end against the plugs 87 and 88, these plugs being provided with centering projections 99 to retain the springs in centered relationship.

Means are provided for connecting chambers 85 and 86 to opposite sides of the pump 82 and these means take the form of passages 101 and 102 extending transversely from the chambers 85 and 86 respectively, and communicating with the gear members of the pump.

The operation of this embodiment of the invention is similar to that of the embodiment illustrated in Figure 1. When the pump is idle the springs 98 retain the pin 96 in centered position and the valves 93 and 94 are both retained away from their corresponding valve seats 90 and 91. At this time a by-pass is open between opposite sides of the pump comprising the passage 101, chamber 85, reduced passage 89, chamber 86 and passage 102. By virtue of this arrangement a by-pass flow of fluid is permitted when the pump is idle.

If now the pump is started in either direction pressure will build up at the pressure side thereof which communicates with the chamber 85 or 86 and this pressure will force the valve 93 or 94 onto its corresponding valve seat, thus closing the by-passage. However, closure of either valve 93 or 94 results in further opening of the other valve, thereby maintaining open the passage connecting the suction side of the pump with the interior of the reservoir to permit flow of fluid to or from the reservoir to compensate for unequal flow of fluid to and from the hydraulic motor.

If an excessive pressure is built up in either the chamber 85 or 86 as a result, for example, of interference with the normal operation of a device actuated by the hydraulic motor, the by-pass connection between opposite sides of the motor is again opened. This is accomplished by virtue of the pressure acting against one end of the pin 96 through the port 95 in the chamber subjected to the higher pressure. When this pressure exerts a force sufficient to overcome compression of the spring opposing movement of the pin 96 away from the valve subjected to the excessive pressure, the pin 96 moves bodily away from said valve and thereby opens the port 95 in the valve.

The drawings and the foregoing specification constitute a description of the improved valve structure in such full, clear, concise and exact terms as to enable any person skilled in the art to practice the invention, the scope of which is indicated by the appended claims.

What I claim as my invention is:

1. In a valve of the character described, a body having a passage terminating at its ends in oppositely facing valve seats, a port intermediate the ends of said passage, an apertured valve cooperable with each of said seats, spring means urging said valves toward their respective seats, a pin loosely slidable longitudinally in said passage, projections on the ends of said pins received in the apertures in said valves, shoulders surrounding said projections effective to close the apertures in said valves when said valves are against said shoulders, said projections having clearance with respect to said apertures when said shoulders and valves are spaced apart, said pin being of a length to prevent simultaneous seating of said valves, ports at opposite sides of said valves, the development of pressure at one side of either valve being effective to seat said valve, and said pin being movable by excessive pressure away from said valve to afford a relief flow of fluid through the aperture therein.

2. A valve body having a passage therein, a supply port intermediate the ends of said passage for connection to a fluid reservoir, a pair of ports at opposite sides of said supply port for connection to the inlet and outlet side of a pump, a valve seat located between said supply port and each of said pair of ports, a pair of valves cooperable with said seats, each of said valves having a central opening therethrough, a centering pin loosely disposed in said passage and slidably received between said pair of valve seats and of a length to prevent simultaneous seating of said valves, said pin having reduced projections at each end received in the openings in said valves and having shoulders around said projections serving to close the openings in said valves, said projections having clearance with respect to said openings when said valves are spaced from said shoulders, spring means urging said valves against the shoulders of said pin, said pin being movable by excess fluid pressure to afford a relief flow of fluid through the opening in either of said valves.

3. A valve body having a passage therein, a supply port intermediate the ends of said passage for connection to a fluid reservoir, a pair of ports at opposite sides of said supply port for connection to the inlet and outlet side of a pump, a valve seat located between said supply port and each of said pair of ports, a pair of valves cooperable with said seats, each of said valves having a central opening therethrough, a centering pin loosely disposed in said passage and slidably received between said pair of valve seats and of a length to prevent simultaneous seating of said valves, said pin having reduced tapered projections at each end received in the openings in said valves and having shoulders around said projections serving to close the openings in said valves, spring means urging said valves against the shoulders of said pin, said pin being movable by excess fluid pressure to afford a relief flow of fluid through the opening in either of said valves.

4. A valve body having a passage therein, a supply port intermediate the ends of said passage for connection to a fluid reservoir, a pair of ports at opposite sides of said supply port for connection to the inlet and outlet side of a reversible pump, a valve seat located between said supply port and each of said parts of ports, a pair of valves cooperable with said seats, each of said valves having a central opening therethrough, a centering pin loosely disposed in said passage and slidably received between said pair of valve seats and of a length to prevent simultaneous seating of said valves, said pin having reduced projections smaller than the openings in said valves at each end received in the openings in said valves and having shoulders around said projections serving to close the openings in said valves, spring means urging said valves against the shoulders of said pin, said pin being movable by excess fluid pressure to afford a relief flow of fluid through the opening in either of said valves.

5. In a valve of the character described, a body having a reduced passage terminating at its ends in oppositely facing seat valves, a port intermediate the ends of said passage for connection to a fluid reservoir, a centrally apertured valve cooperable with each of said seats, spring means urging said valves toward their respective seats, a pin slidable longitudinally in said passage and having clearance therewith, projections on the ends of said pins received in the apertures in said valves, shoulders surrounding said projections effective to close the apertures in said valves when said valves are against said shoulders, said projections having clearance with respect to said apertures when said valves are spaced from said shoulders, said pin being of a length to prevent simultaneous seating of said valves, ports at opposite sides of said valves for connection to opposite sides of a reversible pump, the development of pressure at one side of either valve being effective to seat said valve, and said pin being movable by excessive pressure away from said valve to afford a relief flow of fluid through the aperture therein.

6. In a valve of the character described, a body having a reduced passage terminating at its ends in oppositely facing valve seats, a port intermediate the ends of said passage for connection to a fluid reservoir, a centrally apertured valve cooperable with each of said seats, spring means urging said valves toward their respective seats, a pin slidable longitudinally in said passage and having clearance therewith, tapered projections on the ends of said pin received in the apertures in said valves, shoulders surrounding said projections effective to close the apertures in said valves when said valves are against said shoulders, said pin being of a length to prevent simultaneous seating of said valves, ports at opposite sides of said valves for connection to opposite sides of a reversible pump, the development of pressure at one side of either valve being effective to seat said valve, and said pin being movable by excessive pressure away from said valve to afford a relief flow of fluid through the aperture therein.

7. In a valve of the character described, a body having a reduced passage terminating at its ends in oppositely facing valve seats, a port intermediate the ends of said passage for connection to a fluid reservoir, a centrally apertured valve cooperable with each of said seats, spring means urging said valves toward their respective seats, a pin slidable longitudinally in said passage and having clearance therewith, conical projections on the ends of said pins received in the apertures in said valves, shoulders surrounding said projections effective to close the apertures in said valves when said valves are against said shoulders, said pin being of a length to prevent simultaneous seating of said valves, ports at opposite sides of said valves for connection to opposite sides of a reversible pump, the development of pressure at one side of either valve being effective to seat said valve, and said pin being movable by excessive pressure away from said valve to afford a relief flow of fluid through the aperture therein.

8. A valve body having a pair of aligned cylindrical chambers, a reduced passage connecting said chambers, valve seats at the junctions between the ends of said passage and said chambers, a valve in each of said chambers, said valve comprising flat polygonal elements fitting closely within said chambers and having openings therethrough, a pin loosely disposed in said passage and having reduced projections at its ends located in the openings in said valves, shoulders on said pins against which said valves abut of a size to close the openings in said valves, said projections having clearance with respect to said openings when said valves and shoulders are spaced apart, the length of said pin being sufficient to prevent simultaneous closure of both of said valves on their seats, and springs in said chambers engaging said valves and normally urging said valves into abutting relation against the shoulders on said pin.

9. A valve comprising a chamber adapted to be supplied with fluid under pressure, a fluid escape port in said chamber, a valve seat surrounding said port, a main valve movable toward and away from said seat, means normally retaining said valve spaced from said seat but yieldable when fluid pressure is supplied to said chamber to permit said valve to seat, a relief port in said valve, a relief valve at the side of said main valve adjacent said seat normally closing said relief port and movable with said main valve, said relief valve being exposed to pressure in said chamber through said relief port, said means being effective to urge said relief valve in a direction to close said relief port and being yieldable to permit opening of said relief valve under abnormal pressure conditions in said chamber to provide for opening of said relief valve to permit escape of fluid from said chamber.

References Cited in the file of this patent

UNITED STATES PATENTS

| | | |
|---|---|---|
| 633,706 | Swartz | Sept. 26, 1889 |
| 807,269 | Hildebrand | Dec. 12, 1905 |
| 1,779,251 | Redfield | Oct. 21, 1930 |
| 2,069,366 | Heerdt | Dec. 2, 1937 |
| 2,367,682 | Kehle | Jan. 23, 1945 |
| 2,426,065 | Stevens | Aug. 19, 1947 |
| 2,472,544 | Nissen | June 7, 1949 |
| 2,473,043 | Whisler | June 14, 1949 |
| 2,483,312 | Clay | Sept. 27, 1949 |

FOREIGN PATENTS

| | | |
|---|---|---|
| 519,031 | Great Britain | 1940 |